(12) United States Patent
Shihundu et al.

(10) Patent No.: US 11,907,619 B2
(45) Date of Patent: Feb. 20, 2024

(54) SYSTEM AND METHOD FOR AUTOMATED DESIGN OF ACCESSIBLE RAMPS

(71) Applicant: Transoft Solutions Inc., Richmond (CA)

(72) Inventors: Daniel Akwera Shihundu, Richmond (CA); Vahid Beiranvand, Richmond (CA)

(73) Assignee: Transoft Solutions Inc., Richmond (CA)

( * ) Notice: Subject to any disclaimer, the term of this patent is extended or adjusted under 35 U.S.C. 154(b) by 433 days.

(21) Appl. No.: 16/853,628

(22) Filed: Apr. 20, 2020

(65) Prior Publication Data
US 2021/0294939 A1 Sep. 23, 2021

(30) Foreign Application Priority Data
Mar. 17, 2020 (CA) .................. CA 3076047

(51) Int. Cl.
*G06F 30/13* (2020.01)
*G06F 111/04* (2020.01)

(52) U.S. Cl.
CPC .......... *G06F 30/13* (2020.01); *G06F 2111/04* (2020.01)

(58) Field of Classification Search
CPC .......... G06F 30/20; G06F 30/17; G06F 30/13; G06F 2111/04
See application file for complete search history.

(56) References Cited

U.S. PATENT DOCUMENTS

| | | | | |
|---|---|---|---|---|
| 6,941,711 B2* | 9/2005 | Pevar | ..................... | E04F 11/002 52/174 |
| 7,143,760 B2* | 12/2006 | Gardner | ................ | B24B 23/028 451/28 |
| 7,830,373 B1* | 11/2010 | Gao | ........................ | G06F 30/13 345/419 |
| 9,043,217 B2* | 5/2015 | Cashman | ................ | G16H 70/00 705/2 |
| 9,996,634 B2* | 6/2018 | MacLean | ................ | G06F 30/00 |
| 10,366,180 B2* | 7/2019 | Detwiler | ................. | G06F 30/13 |
| 2003/0140580 A1* | 7/2003 | Pevar | ........................ | E04H 1/02 52/174 |

(Continued)

OTHER PUBLICATIONS

Siemens Product Lifecycle Management Software Inc. "Constructing Procedural Features" SolidEdge Velocity Series, Publication No. spse01535 (2011) (Year: 2011).*

(Continued)

*Primary Examiner* — Jay Hann

(57) ABSTRACT

A system and method for the automated design of accessible ramps is disclosed. A ramp data structure is provided having general shape information for a plurality of ramp types. A ramp environment data structure is also provided with 3D reference information for one or more ramp installation environments. After user selection of a ramp type and installation environment a 3D ramp design is automatically generated conforming to the selected ramp environment. Also, the ramp design may be automatically compared to a design standard to determine if the design is in compliance. Also, convenient editing may be employed while conforming to the ramp environment with real time updates to the 3D ramp design.

18 Claims, 16 Drawing Sheets

(56) References Cited

U.S. PATENT DOCUMENTS

| | | | |
|---|---|---|---|
| 2006/0141917 A1* | 6/2006 | Gardner | B28D 1/04 451/359 |
| 2010/0288379 A1* | 11/2010 | Dahm | F02C 7/04 137/561 R |
| 2015/0051729 A1* | 2/2015 | Carrera | G06F 30/17 700/182 |
| 2015/0199783 A1* | 7/2015 | Cashman | G16H 40/20 705/2 |
| 2016/0220077 A1* | 8/2016 | Blake | A47K 3/281 |
| 2018/0158555 A1* | 6/2018 | Cashman | G06Q 10/1095 |
| 2021/0141966 A1* | 5/2021 | Koch | G06F 30/13 |

OTHER PUBLICATIONS

Autodesk Inc., Civil infrastructure design and documentation software, https://www.autodesk.ca/en/products/civil-3d/overview?term=1-YEAR&tab=subscription.

Bentley Systems, Computer Aided Design and Drafting software, https://www.bentley.com/en/Solutions/CAD-Software?msclkid=3f5d98d2b5f211ec8239c15913d9806b.

\* cited by examiner

Ramp Parameters

Ramp Area
| | Standard | Calculated Value |
|---|---|---|
| Ramp Length: | 15.0 max | 4.00 |
| Ramp Width: | 4.2 min | 4.50 |
| Ramp Slope: | 7.5% max | 15.56 |
| Ramp X Slope: | 15.0% max | 2.34 |

Landing Area
| | Standard | Calculated Value |
|---|---|---|
| Landingp Length: | 4.2 max | 4.20 |
| Landing Width: | 4.2 min | 4.50 |
| Landing Slope: | 1.5% max | 3.62 |
| Landing X Slope: | 1.5% max | 3.75 |

Flare
| | Standard | Calculated Value |
|---|---|---|
| Left Length: | NA | 4.00 |
| Right Length: | NA | 4.50 |
| Left Slope: | 9.0% max | 15.56 |
| Right Slope: | 9.0% max | 2.34 |

Points
| | Elevation | | Elevation |
|---|---|---|---|
| (1): | 4214.12 | (2): | 4213.94 |
| (3): | 4213.53 | (4): | 4213.43 |
| (5): | 4212.91 | (6): | 4212.82 |
| (7): | 4213.50 | (8): | 4213.22 |

Curb and Gutter
| | Standard | Calculated Value |
|---|---|---|
| Counter Slope: | 1.0(V):24.0(H) | 0.00 |
| Flow Line Slope: | 9.0% max | 0.00 |
| Warning Surface: | NA | 0.00 |

Left Conform Width: 2.00   ☐ Hide information
Right Conform Width: 2.00   ☐ Draw as lines

[ Apply ]  [ Grip Edit ]  [ Close ]

FIG. 11

A
SYSTEM AND METHOD FOR AUTOMATED DESIGN OF ACCESSIBLE RAMPS

FIELD OF THE INVENTION

The present invention relates to computer aided design systems and methods. More specifically, the present invention relates to the design of accessible ramps such as wheelchair, or stroller, accessible ramps.

BACKGROUND OF THE INVENTION

Providing access to public spaces for persons with disabilities, or others such as persons with very young children/strollers, is an important design consideration for various public facilities and infrastructure, including transportation infrastructure such as sidewalks, crosswalks, and on street parking, along with various other publicly accessible structures including businesses. These design considerations are typically subject to very specific regulations and guidelines at various government levels. One notable example of such a regulation at the Federal level in the United States is the Americans with Disabilities Act (ADA) which provides specific requirements for ADA compliant designs. Additional requirements are provided by the Public Right-Of-Way Guidelines (POWAG). There are frequently additional regulations or supplements governing accessible designs at the state and municipal levels. Also, each class of designs will typically have specific issues which must be taken into consideration. Other countries similarly have government regulations of accessible designs.

One specific example of a design class requiring careful design for accessibility are wheelchair curb ramps for sidewalks. FIG. 1 illustrates an exemplary wheelchair curb ramp 100 integrated in a sidewalk 102 and extending inward from curb 103 adjacent a street crosswalk 105. Regulations, such as the ADA, may typically specify that the ramp have a landing zone 104 with minimum dimensions, a ramp slope section 106 with a minimum width, maximum running slope (direction 108), and maximum cross slope in direction 110. Side flares 112 if provided also must be limited to a maximum cross slope. A warning zone 114 may also be mandated for alerting the visually impaired to the upcoming curb edge, which zone may typically comprise a rectangular pattern of many small bumps.

Another complication in ramp design for accessible spaces involves the wide range of ramp installation environments. Since ramps may be added to existing structures as well as incorporated in new structures the design variations are extremely large. In view of the specific requirements imposed by various regulations it will be appreciated that designing compliant ramps in such a variety of settings can be a very time consuming process that requires specific training beyond basic CAD skills. This in turn adds considerable time and costs to this important design undertaking. Also, heightened awareness of the above noted regulations and their importance has caused reevaluation of many existing public access designs. As a result there is a need for timely retrofitting of noncompliant designs which increases the need to address the time consuming nature of this design process.

SUMMARY OF THE INVENTION

In a first aspect the present invention provides a computer-implemented method for designing a ramp subject to design standards. The method comprises accessing a ramp data structure stored in a computer readable memory, the ramp data structure comprising a plurality of reference points corresponding generally to a ramp shape. The method further comprises accessing a ramp environment data structure stored in a computer readable memory, the ramp environment data structure comprising reference information for a ramp installation environment, the reference information including at least vertical reference information. The method further comprises automatically combining data from the ramp data structure with reference information from the ramp environment data structure including at least the vertical reference information, employing a computer, to provide new 3D ramp design data and calculated ramp parameters. The method further comprises accessing a reference standard data structure stored in a computer readable memory, the reference standard data structure comprising reference parameters for ramp design, and automatically comparing the reference parameters from the reference standard data structure with at least the calculated ramp parameters employing a computer. The method further comprises employing the new 3D ramp design data to display a corresponding new ramp design on a computer controlled display along with visual indications of compliance or noncompliance with the reference parameters from the reference standard.

In another aspect the present invention provides a computer readable data storage medium having stored thereon data structures and computer executable program instructions. The data structures comprise a ramp data structure comprising a plurality of reference points corresponding generally to a ramp shape, a ramp environment data structure comprising reference information for a ramp installation environment, the reference information including at least vertical reference information, and a reference standard data structure comprising reference parameters for ramp design. The computer executable program instructions comprise instructions for controlling the computer to: automatically combine data from the ramp data structure with reference information from the ramp environment data structure, including at least the vertical reference information, to provide new 3D ramp design data and calculated ramp parameters; compare the reference parameters from the reference standard data structure with at least the calculated ramp parameters; and employ the new 3D ramp design data to display a corresponding new ramp design on a display along with visual indications of compliance or noncompliance with the reference parameters from the reference standard.

In another aspect the present invention provides a computer-implemented method for designing an accessible curb ramp. The method comprises accessing a ramp data structure stored in a computer readable memory, the ramp data structure comprising separate ramp data for each of a plurality of different ramp types. The method further comprises accessing a curb data structure stored in a computer readable memory, the curb data structure comprising separate reference information for each of a plurality of different curb types, the reference information for each curb type including at least 3D reference information. The method further comprises displaying a menu for user selection of a ramp type and a curb type and receiving a user selection of ramp type and curb type. The method further comprises automatically combining data from the selected ramp type with reference information from the selected curb type employing a computer, to create new 3D ramp design data and displaying a rendering of the new 3D ramp design on a computer controlled display using the new 3D ramp data.

Further features and aspects of the invention will be appreciated by those skilled in the art from the following detailed description of the invention.

BRIEF DESCRIPTION OF THE DRAWINGS

FIG. 11 is a schematic drawing of another menu displayed during the computer implemented edit process flow in an embodiment of the system and method of the present invention.

DETAILED DESCRIPTION OF THE INVENTION

Figure 1:
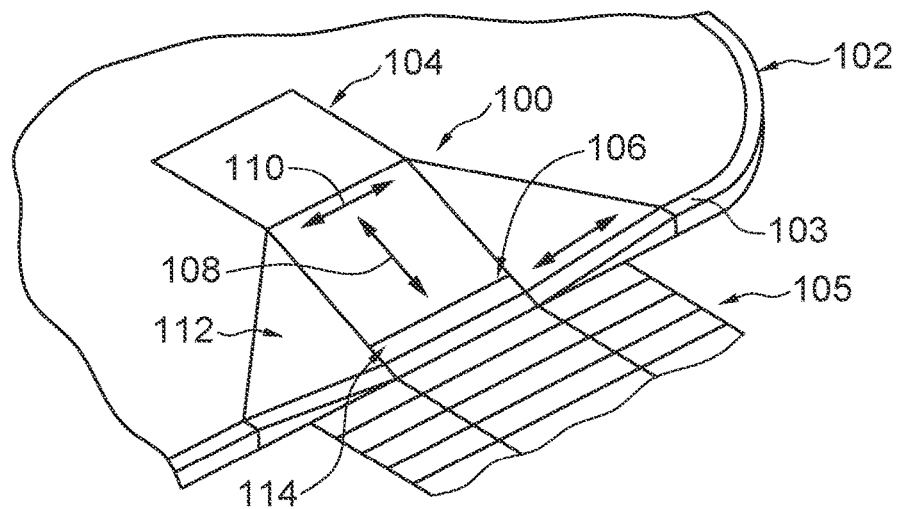
FIG. 1 is a schematic drawing of an exemplary wheelchair accessible ramp integrated in a sidewalk adjacent a crosswalk.
Figure 2A:
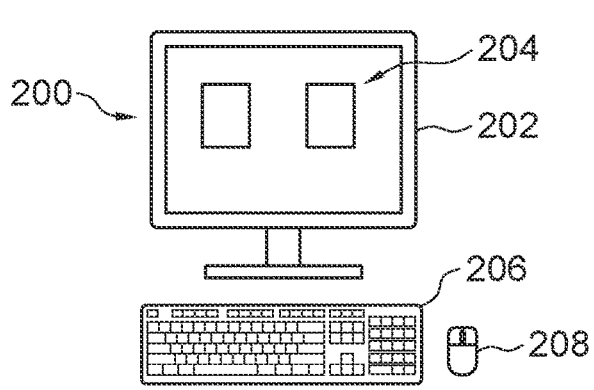
FIGS. 2A-2C are schematic drawings illustrating the basic hardware components employed in an embodiment of the system and method of the present invention.
Figure 2B:
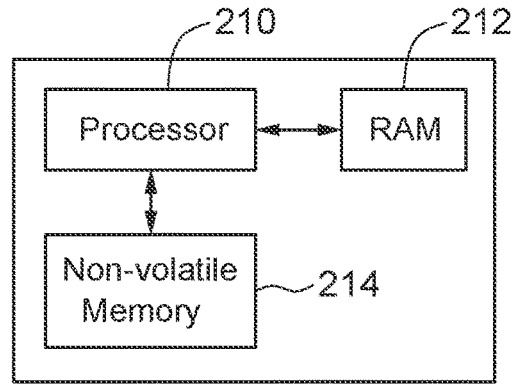
Figure 2C:
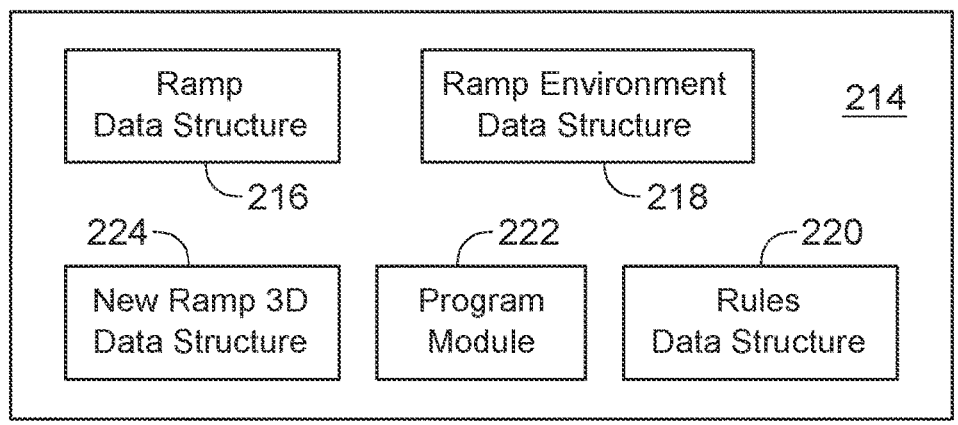

Referring to FIGS. 2A-2C the basic hardware components employed in the system and method of the present invention are illustrated. The system 200 may employ a computer or PC with a monitor 202, for displaying a graphical user interface (GUI) 204, a keyboard 206, and mouse 208. As shown in FIG. 2B the PC further includes a processor 210 coupled to a random access memory (RAM) 212 and a nonvolatile memory 214. Depending on the design these electronic components may be configured in various locations, e.g., in the monitor housing in an integrated design or in a separate chassis. The PC further includes a number of additional components which may be conventional in nature, as well known in the art, and are not shown. Many different computer implementations are of course possible. Also, some or all of the processing and/or storage may be provided non-locally (e.g., in the "cloud") and accessed via internet connection. As shown in FIG. 2C the memory structures employed in the present invention are stored in memory 214 and include ramp data structure 216, ramp environment data structure 218, rules data structure 220, program module 222 and new ramp 3D data structure 224. These are described in detail below.

Figure 3:
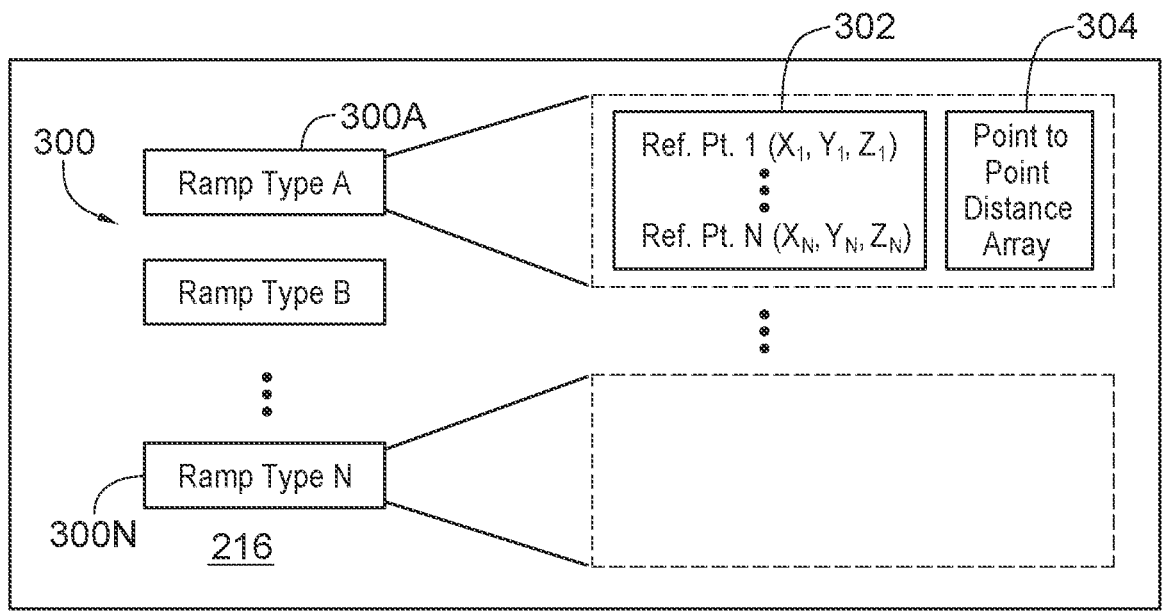
FIG. 3 is a schematic drawing of the ramp data structure employed in an embodiment of the system and method of the present invention.

Referring to FIG. 3 the ramp data structure 216 is schematically illustrated. The ramp data structure includes data defining a plurality of different ramp types illustrated as ramp type A-ramp type N, collectively numeral 300 in FIG. 3. The various ramp types may be compiled from real world use cases and correspond to ramp designs having different characteristics such as landing zone shape and location, side flares and their shape, warning zone shape, size and location, etc. Accordingly, each ramp type will have a different ramp data structure, illustrated as 300A-300N, respectively. A representative data structure for ramp type A is illustrated. Data defining the general shape of the ramp type is stored as a number of reference points, illustrated as stored reference points 1-N, reference numeral 302, for ramp type A in FIG. 3. Each stored reference point may comprise an x, y, z coordinate value with the x, y coordinates of the points providing the basic 2D shape of each ramp section. The number of reference points N employed may vary with the specific implementation and ramp type. Examples of a relatively minimal set of such reference points suitable for defining general ramp section shapes are illustrated graphically in FIGS. 9A and 9B, discussed below. The z coordinate values for each point in turn are populated into the data structure using the environment data during design processing as discussed below. The representative data structure 300A may also include data 304 which may comprise a point to point distance array which associates pairs of reference points stored in 302 with a distance value to provide section dimensions and facilitate calculation of additional ramp parameters. These values will be altered with design editing as discussed below. Not every pair of reference points need be in this array, however, as a subset may be sufficient for design and editing. For example, 2D diagonal point pairs may typically be excluded without loss of design edit flexibility.

Figure 4:
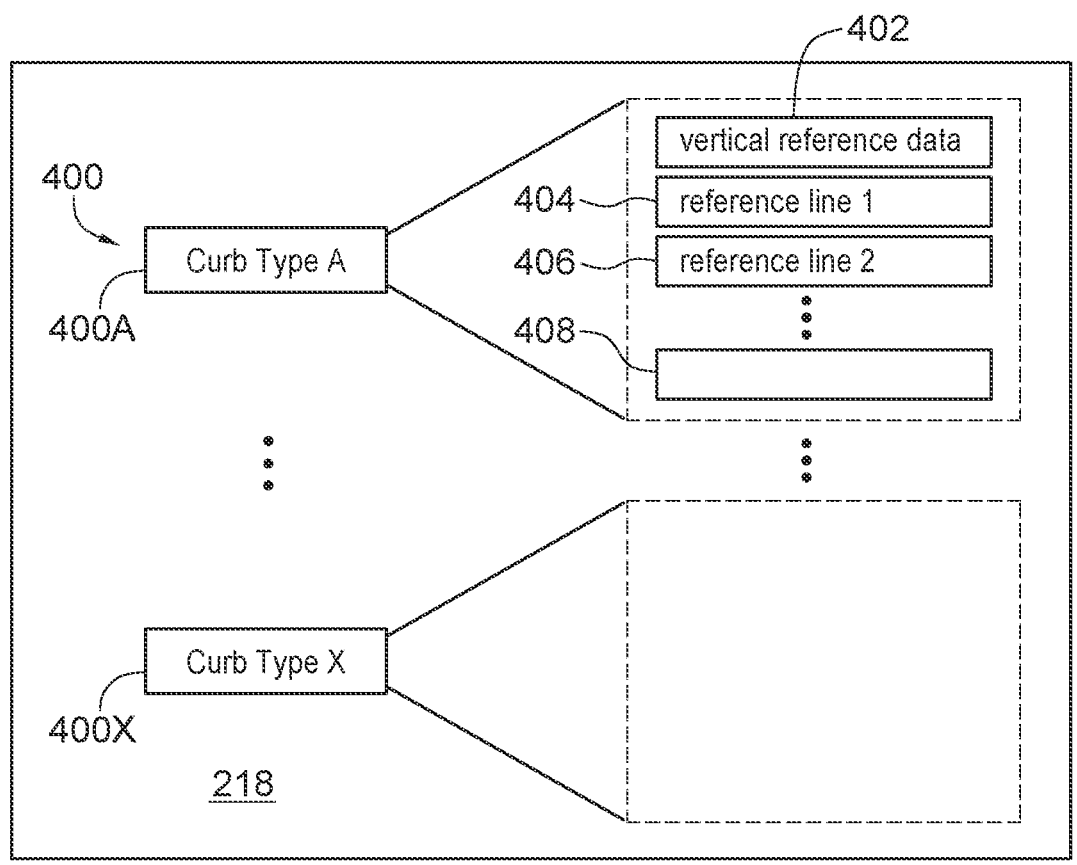
FIG. 4 is a schematic drawing of the ramp environment data structure employed in an embodiment of the system and method of the present invention.

Referring to FIG. 4 the ramp environment data structure 218 is schematically illustrated. The environment reference data structure 218 includes 3D data defining the real world environment where the ramp will be located. For example, in the case of a curb ramp the data structure 218 will contain data specifying key characteristics of different real world curb types 400. The data structure(s) 400 will include data which may be used as alignment references, such as basic curb shape including curb boundaries to be used as alignment lines, and vertical reference data, which together provide 3D data may be used to create new ramp data referenced to the environment, as discussed in more detail below. For example, various transportation authorities may have a set of sidewalk and curb designs which are standardized and which may be used to compile the data for plural data structures 400A-400X. This type of standardized environment data may be used for the design of ramps for new installations and the user will select a desired curb design for the new installation. The ramp design may also be intended for installation in an existing environment, e.g., an existing curb and sidewalk. In this case the ramp environment data structure 218 will include survey data necessary for the design. This survey data will include elevation data providing a general elevation map of the installation site along with sidewalk and curb boundary information (typically at least curb edge reference lines and inner sidewalk reference lines). (In this case plural curb data structures 400A-400X need not be necessary if a single installation site is to be designed.) Both types of environment data may be provided, however, in a more general environment data structure which may include pre-stored data and the ability to add new survey based data or new standardized data sets. Both types of data are schematically illustrated for data structure 400A as vertical reference data 402 (elevation data or height data), reference lines 404, 406, and optionally additional reference lines or other reference data 408. In one preferred embodiment the reference data 402, 404, 406, 408 may be part of a continuous 3D model of the environment, for example part of pre-existing design templates or derived from survey data. Such a model will have an upper surface, or other suitable vertical profile, which then provides the vertical reference for subsequent ramp design processing, along with reference lines which may be adapted for ramp alignment as discussed below. Alternatively, discrete data with the necessary 3D information may be used to create a 3D model of the environment, for example using conventional 3D modeling techniques such as commercially available 3D CAD software. In this case the 3D environment model (for each curb type for example) is preferably created in advance of the new ramp design creation described below and stored in environment data structure 218.

Figure 5:
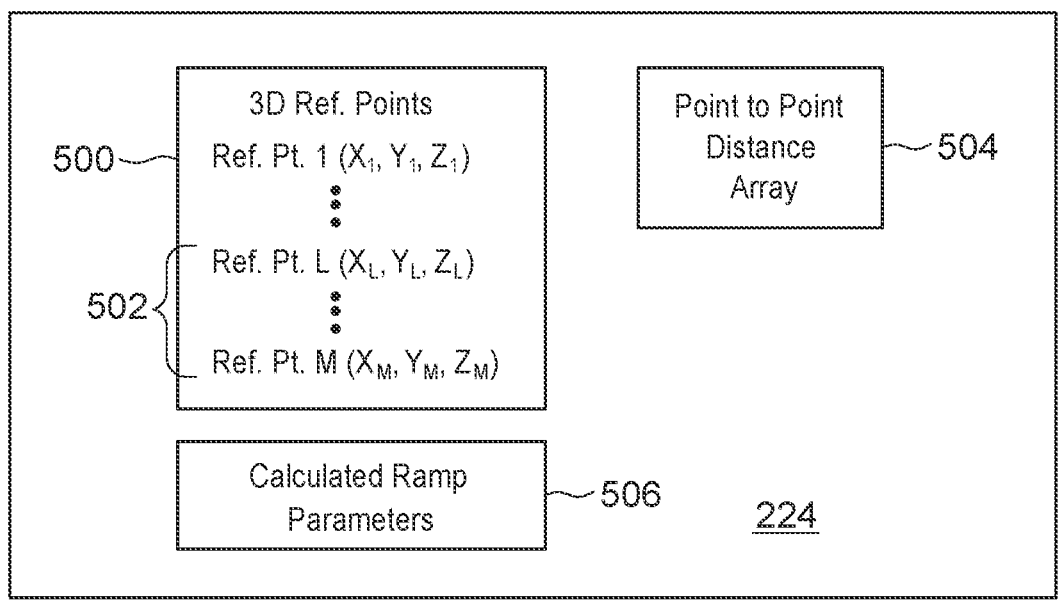
FIG. 5 is a schematic drawing of the new ramp 3D data structure employed in an embodiment of the system and method of the present invention.

Referring to FIG. 5 the new ramp 3D data structure 224 is schematically illustrated. Data structure 224 is created to define the new ramp design during the ramp design process flow using data for the selected ramp type from the ramp data structure and data from the environment data structure to define the new ramp design as discussed below. New ramp 3D data structure 224 will have 3D reference point data structure 500 and point to point distance array 504 each with a similar structure to ramp data structure 216 but with new data values. In addition reference point data structure 500 will include specific points 502 marked as anchors which will map to specific coordinates of the environment. Also the data structure 224 will include calculated reference parameters 506 for the specific ramp design such as section dimensions and slopes which may be very efficiently calculated from data in array 504.

The rules data structure 220 encodes the ramp requirements required to be met, e.g., as set by a specific government set of regulations such as the ADA, in a format which allows the requirements to be automatically mapped onto the ramp design as discussed below. This format may preferably correspond to the format of calculated ramp parameters 506 (FIG. 5). This may typically be a simple table format and an example is illustrated as part of the displayed data shown in FIG. 11 discussed below.

Figure 6:
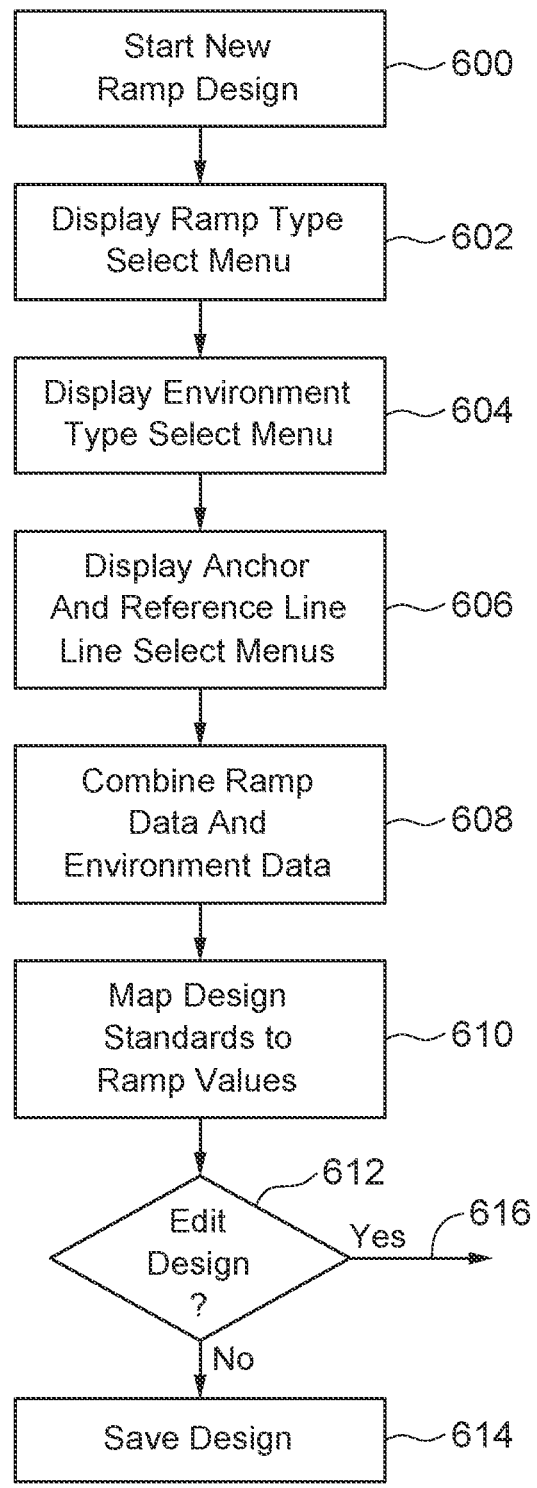
FIG. 6 is a flow diagram of the computer implemented process flow in an embodiment of the system and method of the present invention.

Referring to FIG. 6 the process flow implemented by the system processor 210 and the stored instructions in program module 222 is schematically illustrated in a flow diagram. The specific discussion of the illustrated process flow and illustrated menus in FIGS. 7A-7E correspond to design of a curb ramp, however, it should be appreciated that the basic process flow may apply to other types of ramps and other types of ramp environment and such discussion of a curb ramp is one example only and should not be viewed as limiting in any way. At step 600 the process flow for a new ramp design is initiated, for example from a high level menu. The ramp design process flow then proceeds to step 602 where a menu is presented to the user with a drop down list of ramp types corresponding to the ramp data stored in ramp data structure 216. The user may then simply highlight and select the desired ramp type. The corresponding ramp reference point data and point to point distance data is then automatically accessed from the stored data structures 302, 304 under processor control and used for the subsequent ramp design. Next, at step 604 a menu with a drop down list of environment types stored in data structure 218 is displayed and the user then selects the desired environment reference, in this case curb type. The selected curb type reference data is then automatically accessed from the data structure 218 and used for the subsequent ramp design process flow.

Figure 7A:
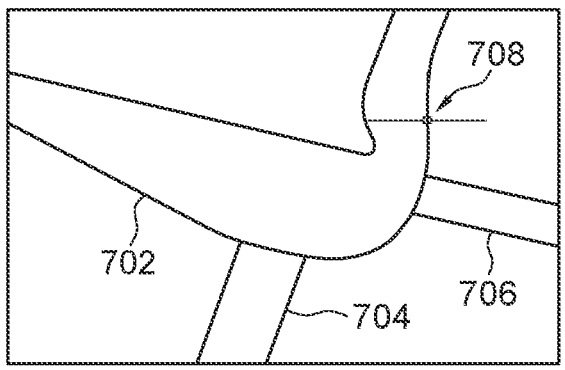
FIGS. 7A-7E are schematic drawings of menus displayed during the computer implemented process flow in an embodiment of the system and method of the present invention.
Figure 7B:
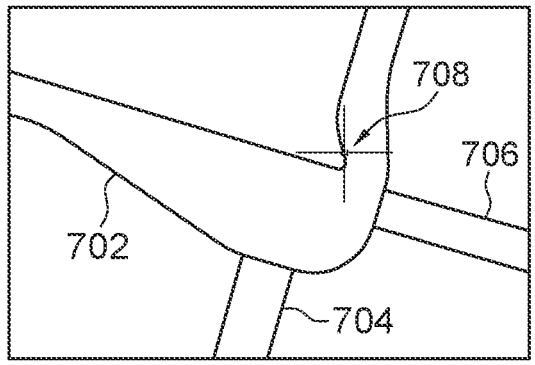
Figure 7C:
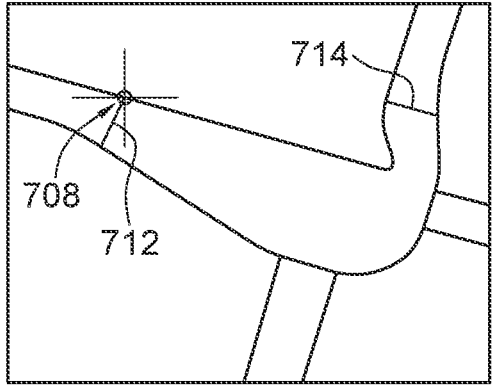
Figure 7D:
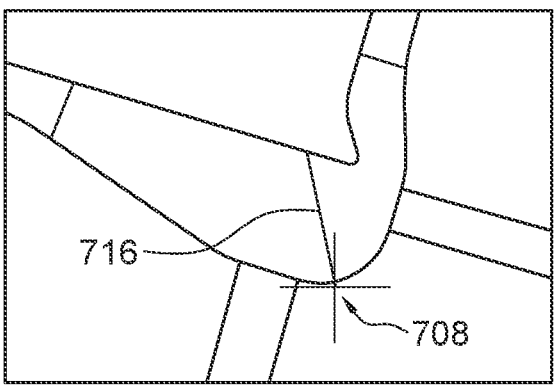

Still referring to FIG. 6 the process flow continues to step 606 where one or more selection menus are displayed, specifically curb anchor point and reference line selection menus. These menus allow the user to define the location on the curb where the ramp will be placed using one or more anchor points (or lines) for modifying the ramp data to conform to the curb geometry. As one specific example, the menus may display curb outlines as generally illustrated in FIG. 7A-7E, corresponding to the curb data previously selected (and preferably using a corresponding 3D curb model), for user selection of these anchor(s) and reference lines. A drop down menu may also optionally be employed to select an anchor type, e.g., "back of curb", for use in creating the displayed outlines. More specifically, in FIG. 7A a representative reference line corresponding to the back of curb 702 is illustrated as displayed as part of the menu displayed on the computer monitor. This may simply be selected using the cursor 708 to provide an anchor reference line for the rest of the design. (Additional portions of the curb environment may also be displayed for reference purposes, for example crosswalks 704, 706.) In FIG. 7B a second reference line 710 is illustrated which may correspond to the back of the sidewalk which is again simply selected by using cursor 708. In FIG. 7C the menu is illustrated where the user defines the left and right edges of the ramp location in the curb environment. Specifically, in the case of a retrofit to an existing curb/sidewalk the user defines a left saw cut line 712 (left edge boundary between the new ramp and old sidewalk) using cursor 708 followed by a right saw cut line 714 as generally illustrated. Next, as illustrated in FIG. 7D the center line 716 of the ramp may be defined, again using cursor 708. This completes the definition of the ramp location and alignment in relation to the curb environment.

As an additional selection option, either before or after the above noted selection of anchor points and reference lines, the vertical reference may be adjusted. As noted above the vertical reference from the curb/environment data structure is preferably in the form of a reference surface, which may be the upper surface of a 3D model of the curb/environment. The vertical position and/or the shape of this reference surface may optionally be modified by the user. In particular, where the reference surface is generated from survey data from an existing location to be retrofitted with a ramp the surface may not be smooth. It may therefore be advantageous to raise or lower the surface incrementally to a level which can be smoothed out while matching the curb and sidewalk level at the saw cut lines. This edit may be provided by a simple raise/lower menu with selection also of vertical increment value. Shape in turn may employ access to the 3D model with a 3D editing tool of a type which is commercially available.

Figure 7E:
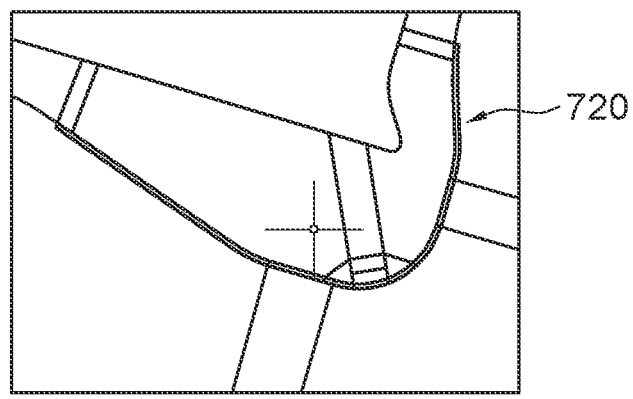

Still referring to FIG. 6 the process flow then proceeds at step 608 to automatically combine the stored ramp data and the curb anchor and alignment data, using the programmed computer processor, to generate new 3D ramp data and display the computed ramp design. More specifically, ramp data reference points 302 (FIG. 3) may be accessed and the curb vertical reference information at each x, y coordinate location used to populate the coordinates with vertical z values to create a set of 3D reference points 500 which are stored in a new ramp data structure 224 (FIG. 5). Selected ramp reference points are also conformed to the x, y values of the curb anchor line and stored as anchor points 502. Similarly, additional reference points are conformed to the x, y values of the sidewalk reference line and saw cut reference lines discussed above. The modified x, y reference point values are employed to update point to point distance values in array 504. Additional ramp parameters are then either read out from selected point to point values, or readily calculated using z information, from the newly defined ramp point to point distance values in the distance array 506. These values are saved, for example in a table structure, as calculated ramp parameters 506 in new ramp data structure 224 (FIG. 5). These calculated parameters may include, for example, ramp length, ramp width, ramp slope, ramp cross slope, landing area length, landing area width, landing area slope, landing area cross slope, and, if applicable, flare parameters including flare left length, flare right length, flare left slope, and flare right slope. The resulting new ramp data defines the completed ramp design 720 configured to conform to the curb and sidewalk which may then be displayed as generally illustrated in FIG. 7E (optionally shown along with cross walks for reference). Although the ramp design conforms to the environment (curb and sidewalk in the example), it should be noted that it is a separate 3D file from the environment which provides flexibility for editing and display, including for example providing a 3D ramp surface display, as discussed below.

Figure 10:
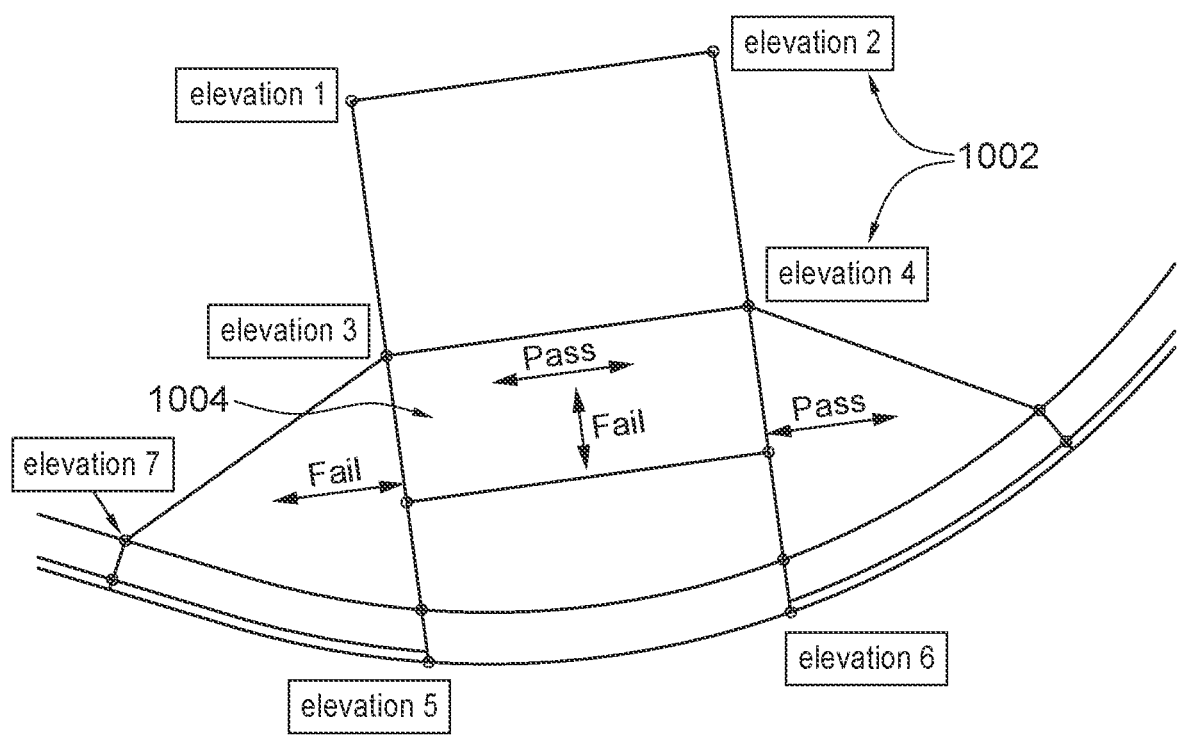
FIG. 10 is a schematic drawing of another menu displayed during the computer implemented edit process flow in an embodiment of the system and method of the present invention.

Still referring to FIG. 6 the process flow continues to step 610 where the rules data structure is accessed and compared to the updated ramp design data generated at step 608. As noted above the rules standards for ramp designs (for example, regulations such as the ADA) may be stored in a format matching the calculated ramp parameters 506, for example in a simple table. The comparison may therefore be a simple table entry by entry comparison, which may also be displayed. An example of such a display is shown in the menu of FIG. 11 with side by side display of design rule standards and calculated ramp values. The comparison may also be displayed as graphical data for display, one example of which is illustrated in FIG. 10 which is discussed below. Alternatively, the detailed display of standards values may be deferred until editing (if necessary) and a simple pass/fail indicator may be provided. If the design complies with the design rules then there may be no need to edit the design and at step 612 the user may proceed to save the design at step 612 and exit the design program. If the design is not fully rules compliant or if design changes are desired for other reasons at step 612 the user may select at 616 to proceed to the edit process flow illustrated in FIG. 8. Alternatively, this determination may be made automatically if the ramp design parameters do not comply with the applicable rules standard.

Figure 8:
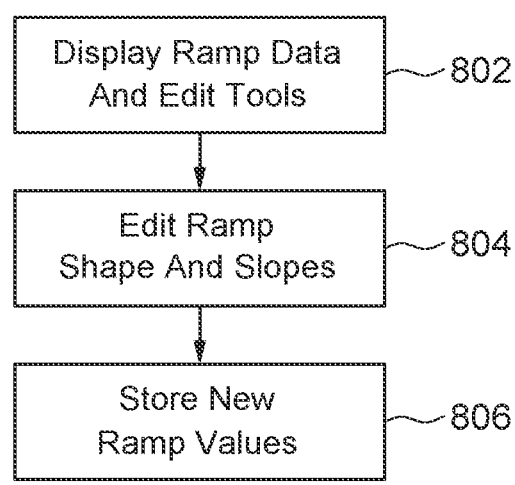
FIG. 8 is a flow diagram of the computer implemented editing process flow in an embodiment of the system and method of the present invention.
Figure 9A:
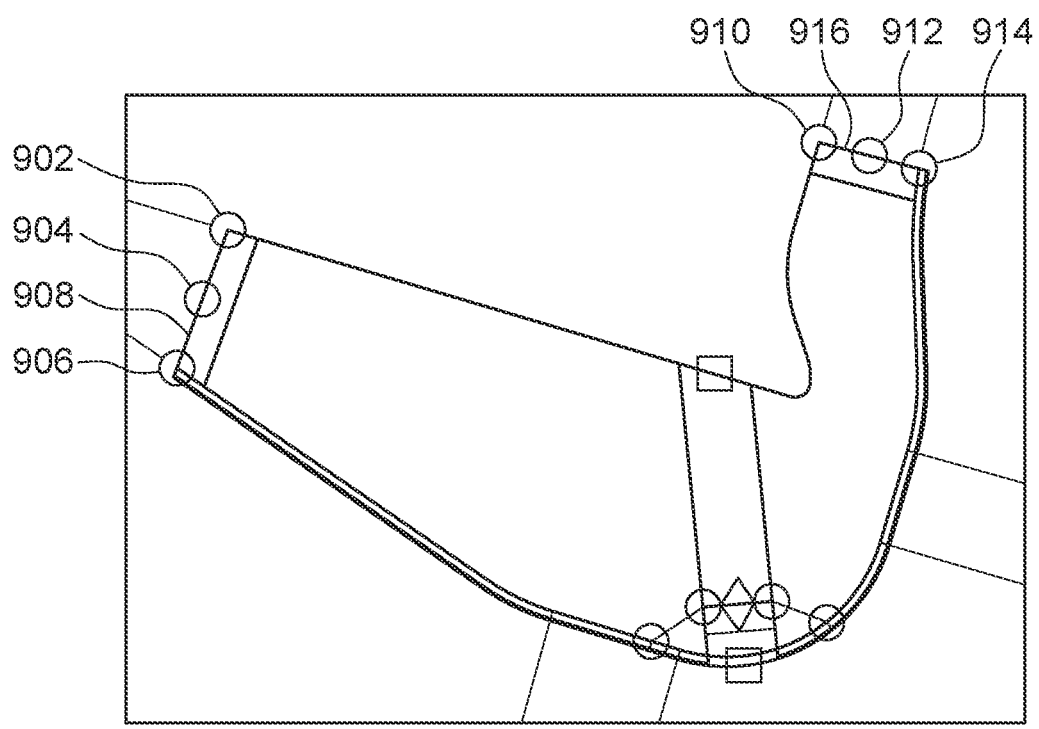
FIGS. 9A-9B are schematic drawings of menus displayed during the computer implemented edit process flow in an embodiment of the system and method of the present invention.
Figure 9B:
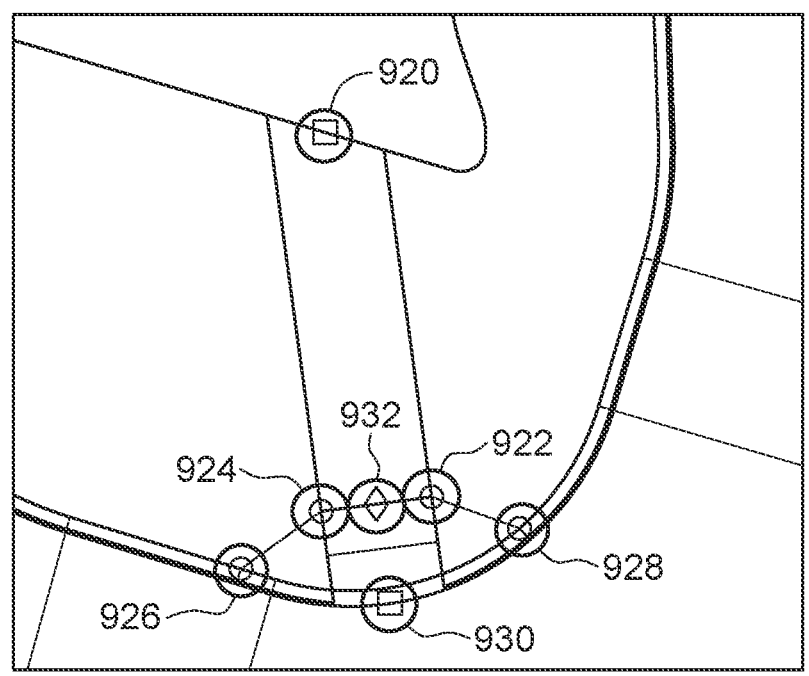

Referring to FIG. 8, the edit process flow is illustrated. This editing process may be entered after initial ramp design or later from a higher level menu. In addition to rules compliance edits this process allows other changes as well such as changes of ramp shape, ramp section dimensions and ramp position in the environment. At step 802 the ramp edit tools are displayed along with the ramp data values and corresponding values from the rules standards. In a preferred embodiment, the editing tools may include a series of grip points configured around the ramp outline as generally illustrated in FIGS. 9A and 9B and a series of call outs as generally illustrated in FIG. 10. As illustrated in FIG. 11 a table may display values from the rule standards and the corresponding calculated ramp values.

More specifically, the grip points illustrated in FIGS. 9A and 9B, are provided to allow the user to easily edit the shape and dimensions of the ramp automatically by simply dragging selected grip points using a cursor. The curb 3D model is accessed during the editing process to automatically conform the ramp data to the curb alignment reference lines, as discussed above in relation to the original ramp design process flow, as the grip points are moved. At the same time vertical reference information from the reference surface in the curb 3D model is used to update the ramp vertical (z) information as the grip points are moved, which in turn allows the calculated slopes to be updated in real time and displayed. In the specific embodiment illustrated in FIG. 9A, three grip points 902, 904 and 906 are provided to allow editing of the left saw cut line 908 and similarly three grip points 910, 912, and 914 are provided for editing the right saw cut line 916. The top and bottom saw cut grip points, 902, 906 and 910, 914, allow the user to move the individual corners to adjust the angles of the respective saw cut lines automatically by simply dragging the grip points. The middle grip points 904, 912 in turn allow the user to slide the saw cut along the reference alignment lines of the curb and sidewalk. The grip points used for editing the landing area and the ramp slope geometry are shown in FIG. 9B. In the illustrated embodiment seven grip points 920, 922, 924, 926, 928, 930 and 932 are provided. Grip point 920 allows the user to change the angle of the ramp (clockwise or counterclockwise in the 2D view of the Figure), grip point 932 allows the user to change the length of the ramp, grip point 930 allows the user to move the ramp along the alignment of the curb, grip points 922 and 924 allow the user to adjust the width of the ramp, and grip points 926 and 928 allow the user to adjust the flare of the ramp, automatically conforming to the curb geometry by simply dragging the grip points. The different types of grip points may have icons (as shown) or may be color coded to facilitate selection of the desired type of editing control function.

In FIG. 10 an additional editing menu is illustrated employing call outs with elevations 1002 as well as call outs with slope indications 1004, indicating whether not the various slopes conform to the standards specified by the rules. As one example, slopes in compliance may be indicated with green arrows and noncompliant slopes indicated in red to allow the user to assess compliance of the ramp design at a glance. Other visual indications of rule compliance may also be employed and, for illustration purposes only, compliant values are indicated in FIG. 10 as "pass" with noncompliant values indicated with "fail". Some or all of the elevation and slope call outs are also preferably included in the table menu, generally illustrated in FIG. 11. Adjustment of some or all of these values may be made simply by entering the new value in the corresponding entry in the table. This editing procedure using the displayed ramp and edit tools is illustrated at step 804 in FIG. 8 and when completed will result in a new ramp design with rule compliant sizes and slopes and the desired shape while automatically conforming to the curb environment under programmed processor access to the stored curb data. The revised ramp values will then be stored at step 806 in data structure 224. The stored values may include the calculated ramp parameters and rules data for future editing if desired.

Although the above described design flow will result in a ramp design file suitable for creation of a design and editing, it may be helpful in many circumstances to have a 3D surface model of the ramp structure for use in visualization of the design without any extraneous data. Many end users may prefer to work with such a file. For example, the ramp design as a separate 3D rendering may be transmitted to a remote site contractor with survey experience but little CAD experience who may more readily work with such a file for a ramp addition retrofit of an existing curb. Elevation call outs may optionally be retained and provide a convenient reference for a ramp installation at a surveyed curb retrofit. Various site planning personnel may also prefer to use such a 3D ramp surface as a reference.

Figure 12:
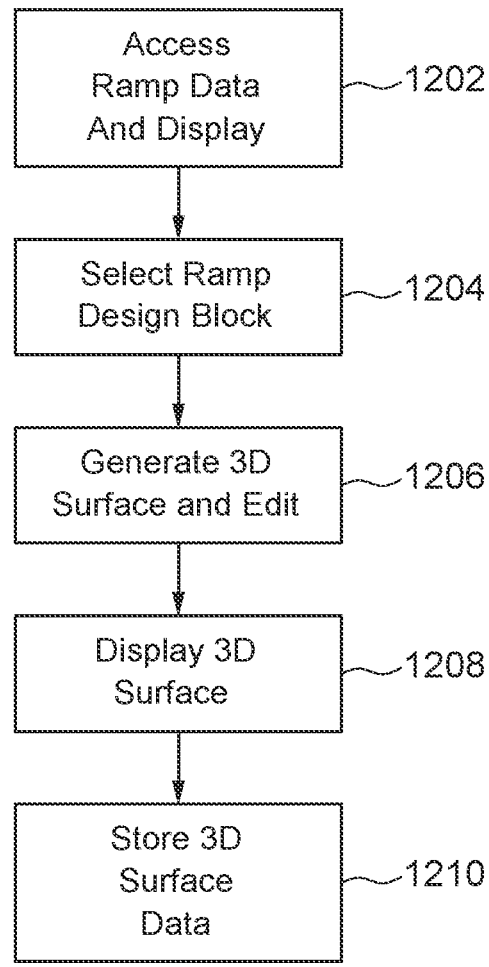
FIG. 12 is a flow diagram of the computer implemented process flow for creating a 3D surface in an embodiment of the system and method of the present invention.
Figure 13A:
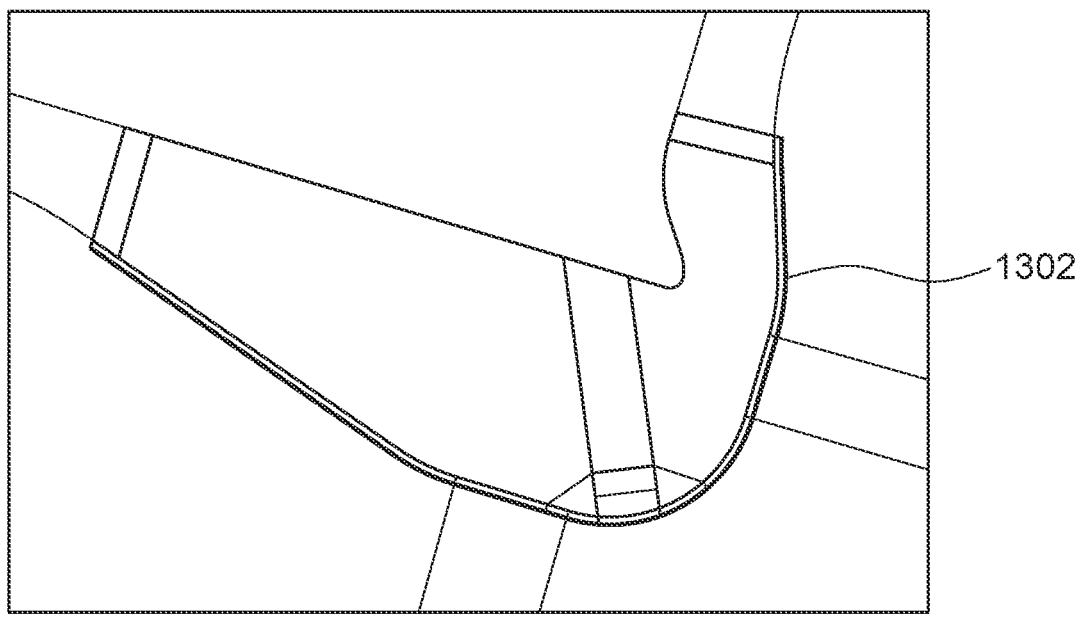
FIGS. 13A-13E are schematic drawings of menus displayed during the computer implemented process flow for creating a 3D surface in an embodiment of the system and method of the present invention.
Figure 13B:
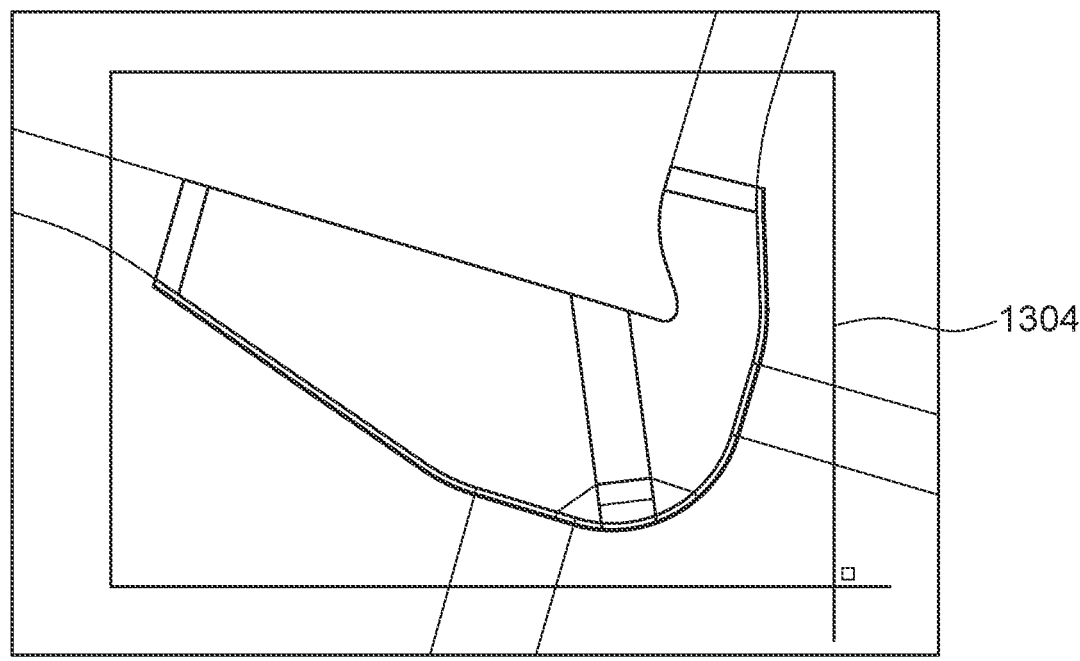
Figure 13C:
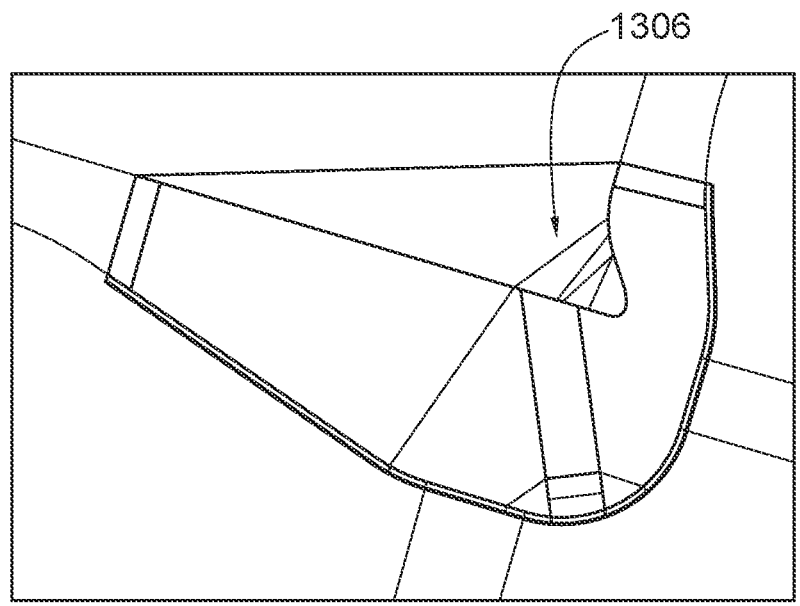
Figure 13D:
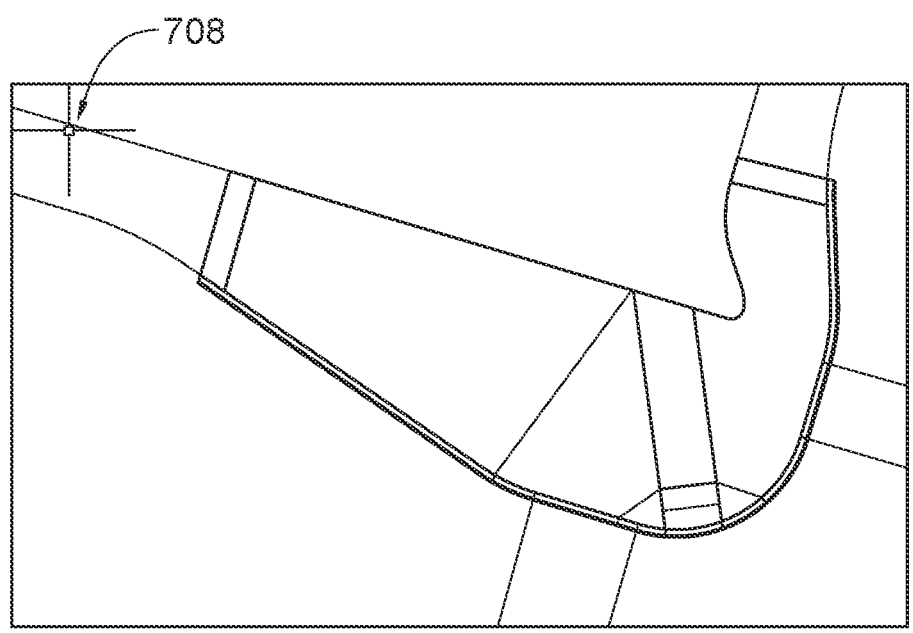
Figure 13E:
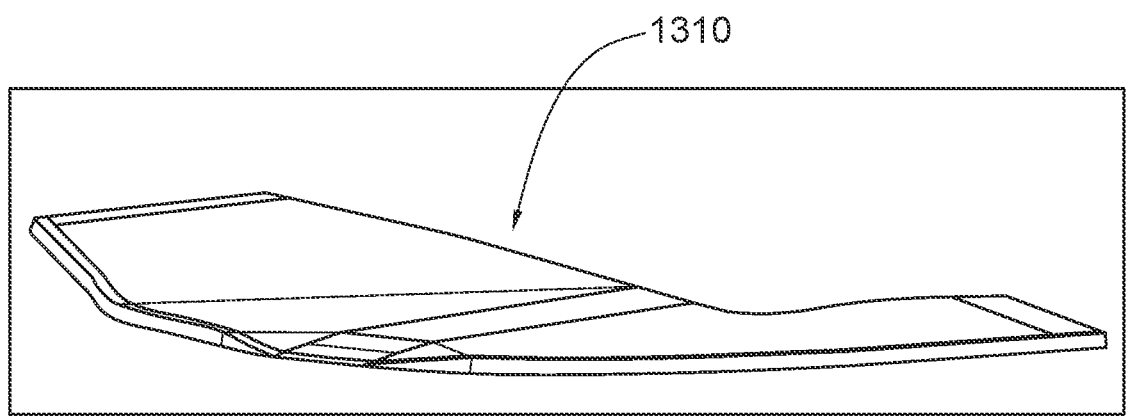

A process flow for creation of such a 3D surface is illustrated in FIG. 12. At step 1202 the process flow begins by accessing the (revised and edited if necessary) ramp 3D data structure file 224 and displaying the design for editing. Any undesired lines or editing features may be removed at this point. At step 1204 the portion of the displayed design desired to be generated into a 3D surface is selected by the user as illustrated by highlighting selection region 1302 in FIG. 13A. Next the process flow proceeds to step 1206 where the user explodes a selected portion 1304 into individual lines and selects desired lines, as shown in FIG. 13B. Next at step 1206 a 3D surface is generated and any remaining unwanted lines 1306 may be removed by the user using an edit menu and/or cursor selection resulting in the surface as generally illustrated in FIGS. 13C and 13D. The resulting clean 3D surface 1310 is displayed at step 1208 as generally illustrated in FIG. 13E.

Figure 14:
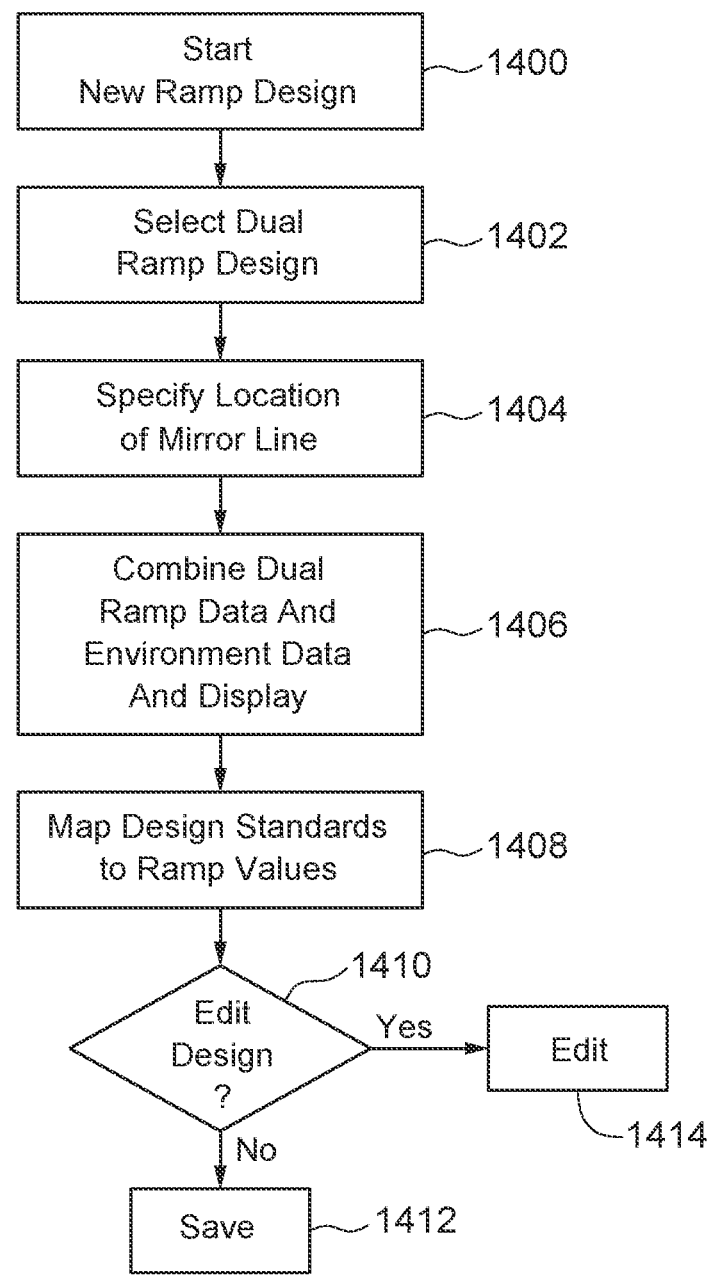
FIG. 14 is a flow diagram of the computer implemented process flow for creating a dual curb ramp design in an embodiment of the system and method of the present invention.
Figure 15A:
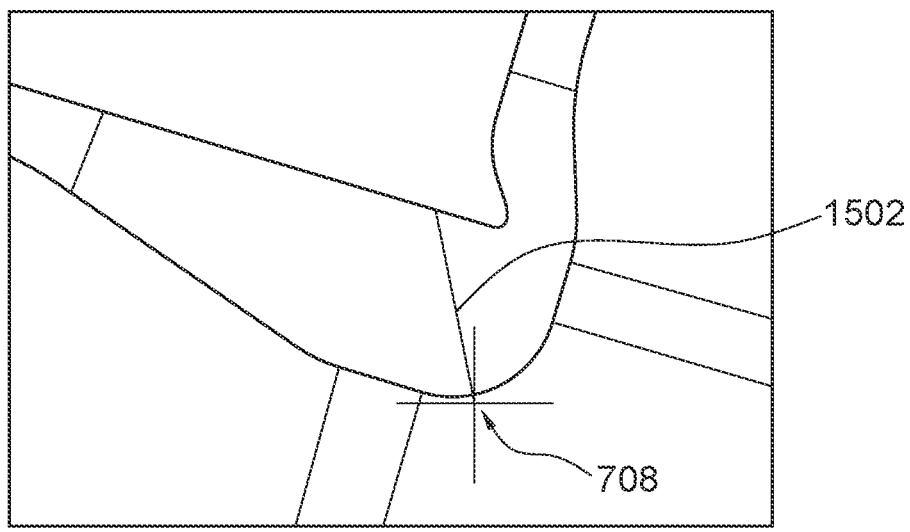
FIGS. 15A-15D are schematic drawings of menus displayed during the computer implemented process flow for creating a dual curb ramp design in an embodiment of the system and method of the present invention.
Figure 15B:
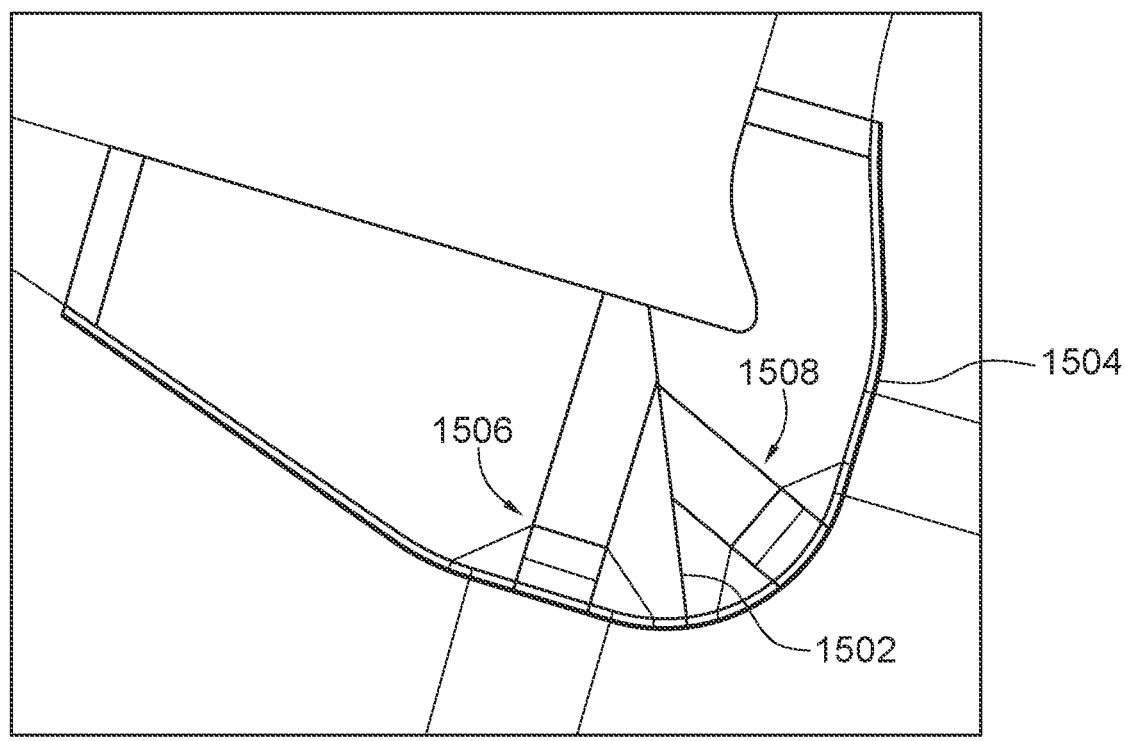
Figure 15C:
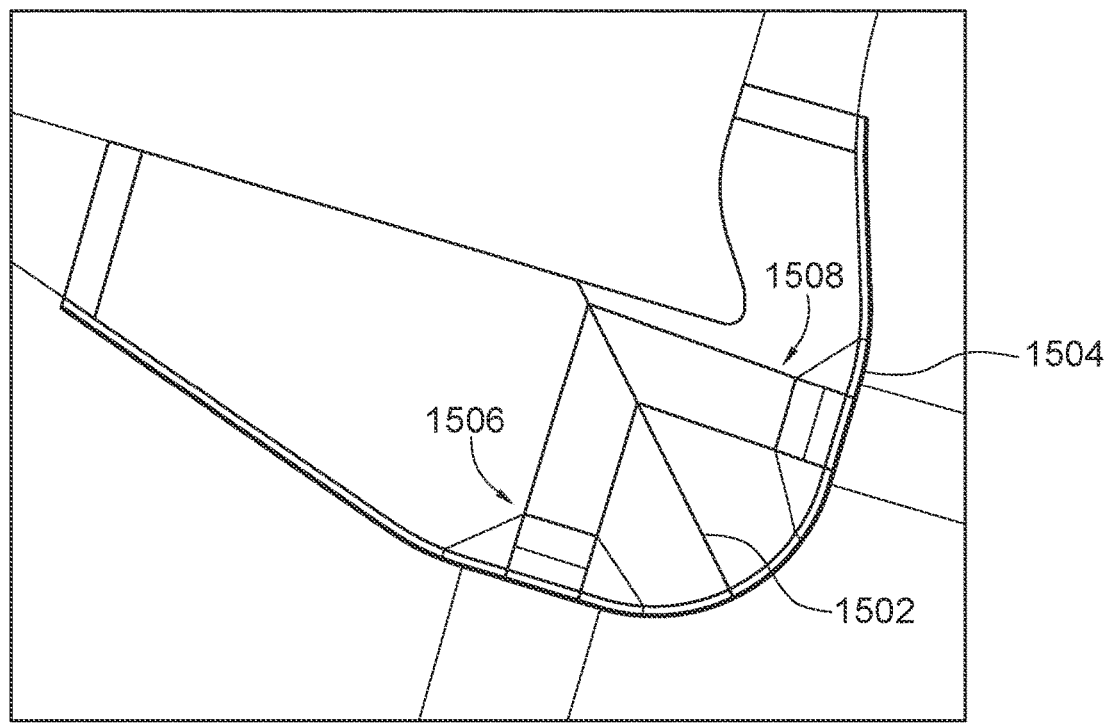
Figure 15D:
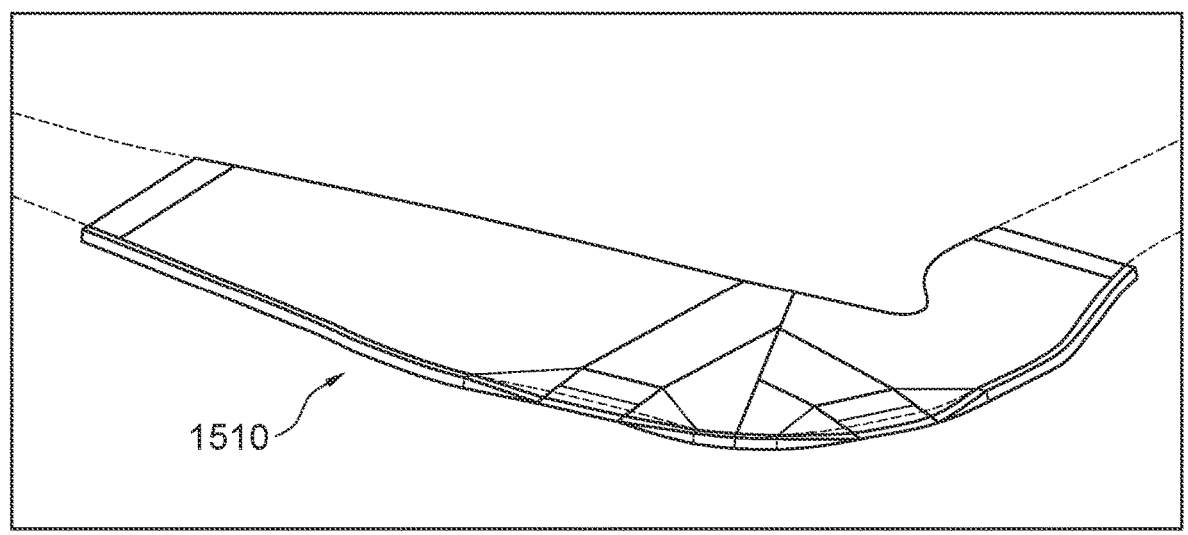

In another aspect the automated design system may conveniently generate dual ramp designs with little additional effort. A very common curb ramp design environment involves two curb ramps at a corner with two crosswalks. The present invention provides a very easy to use automatic design flow for such a dual curb ramp design. More specifically, referring to FIG. 14 the process flow begins at step 1400 to initiate a new ramp design as in the case of a single ramp design as discussed above. At the next step 1402, corresponding to the ramp design type selection described above, the user selects a dual ramp design type from the stored design types in the ramp data structure 216 described above. The process flow may then proceed in the same manner as discussed above for a single ramp in relation to FIG. 6, up to the selection of the saw cut lines as illustrated in FIG. 7C, which discussion is incorporated herein by reference and not described again in detail. The process flow next proceeds to step 1404 where instead of selecting a new ramp center line as in the single ramp case discussed above, a mirror line is selected as illustrated in FIG. 15A. As the name suggests, the mirror line 1502 defines the halfway location between the two ramps which is used to duplicate the ramp design on either side of this mirror line 1502. At step 1406 the process flow next automatically combines the ramp data from the ramp data structure 216 with the curb data, as for a single ramp design described in detail in relation to FIG. 6, but duplicating the ramp on either side of the mirror line 1502. The resulting dual ramp design 1504, comprising ramps 1506 and 1508, is generally illustrated in FIG. 15B. The dual ramp creation automatically adjusts each ramp for the position of the other ramp, if there is an overlap, as illustrated in FIG. 15B. Next at step 1408 the process flow proceeds to map the standard rules onto the ramp design. As in the case of the single ramp design this will involve calculating the ramp parameters using the curb data and comparing it with the rules standards. At step 1410 the user determines whether to proceed to save the design at step 1412. If a determination is made that edits are needed, because the design does not comply with the rules or edits are otherwise needed, the process flow proceeds to step 1414 to edit the design. The edit process flow may proceed as described above in relation to a single ramp design, which discussion is incorporated herein by reference, however, edits that are made to one of the two ramps will be automatically duplicated for the second ramp. Edits to the dual ramps may also include moving the mirror line, e.g., to align the two ramps with respective cross walks as illustrated in FIG. 15C. The resulting dual ramp design may then be saved as discussed above for the case in a single ramp design. If desired the data may be further processed to provide a 3D rendering 1510, as in the single ramp case, as illustrated in FIG. 15D. Therefore, with no more effort than a single ramp design a 3D dual ramp design may be automatically created and edited.

As another aspect of the invention, portions of the above described system and method may be used for relatively easy and fast evaluation of an existing ramp installation for compliance with a design standard. More specifically, careful surveying may be used to generate a 3D ramp model similar to the new ramp design model described. Stored rules standards may then be compared to the model as described for a new design and used to determine if the ramp is in compliance. If necessary, design edits may then be evaluated using the above described editing processing to determine if a simple retrofit/redesign is possible to achieve compliance while retaining some of the existing structure.

In view of the above description of preferred embodiments it will be appreciated that the ramp design system and method of the present invention has numerous desirable features and advantages. For example, the disclosed system and method provides for very fast and efficient ramp design in a variety of installation environments. In particular, the preferred embodiment described provides ease of use by storing a number of different ramp designs and separate environment 3D data for easy selection of many many design combinations by the user. The disclosed preferred embodiment also increases the efficiency of the processor handling of the ramp and environment data by manipulating only the ramp data while using the separate environment data as reference. Also the data structures employed allow fast updating of ramp parameters. As a result real time editing may be provided while maintaining ramp consistency with the desired installation environment and real time update of calculated parameters. As a result design time and costs may be significantly reduced. Also, compliance with accessible ramp design standards may be automatically checked and edits easily made if necessary while comparing relevant standard and design parameters in real time. Also, a 3D ramp design separate from the environment data but nonetheless conforming thereto may be created providing flexibility for use of the design and for creation of a 3D ramp surface for ease of visualization. Additional features and advantages will be appreciated by those skilled in the art.

It will be appreciated by those skilled in the art that the disclosed preferred embodiments are purely illustrative in nature and a large number of modifications may be made within the scope of the invention. For example, the order in which of many of the processing steps are performed may be varied while maintaining the desired results. Also, depending on the implementation, some of the steps may not be necessary. Also, as specifically described, the ramp design system and method of the present invention may be used for designing ramps for new installations as well as for retrofitting existing structures with new ramps. Also, the ramp design system and method of the present invention is not limited to wheelchair ramps or curb environments and may be used for designing a variety of other ramps, such as driveway ramps for example. Various modifications in addition to those specifically described may be employed for these two different implementations.

It will be appreciated by those skilled in the art that many additional modifications too numerous to describe in detail may be made while remaining within the scope of the present invention.

What is claimed is:

1. A computer-implemented method for creating a ramp design subject to design standards, comprising:
    accessing a ramp data structure stored in a computer readable memory, the ramp data structure comprising a plurality of reference points corresponding generally to a ramp shape, the plurality of reference points including at least vertical information of said ramp shape;
    accessing a ramp environment data structure stored in a computer readable memory, the ramp environment data structure comprising reference information for a ramp installation environment, the reference information including at least vertical reference information;
    displaying a graphical user interface on a computer-controlled display employing the plurality of reference points from the ramp data structure and the reference information from the ramp environment data structure;
    receiving a user selection from the graphical user interface of anchor reference information to locate and align the plurality of reference points of the ramp data structure with the reference information from the ramp environment data structure;
    automatically combining reference points in real time from the ramp data structure with reference information from the ramp environment data structure, employing a computer, to populate a new 3D ramp design data structure stored in a computer readable memory, the new 3D ramp design data structure comprising a plurality of combined reference points corresponding to a new ramp shape including at least the user selected anchor reference information as a subset of the new reference points, a point-to-point distance array, and a plurality of calculated new ramp parameters calculated using one or more of the point-to-point distance array and the plurality of new reference points;
    accessing a reference standard data structure stored in a computer readable memory, the reference standard data structure comprising reference parameters for ramp design;
    automatically comparing in real time the reference parameters from the reference standard data structure with at least the corresponding calculated new ramp parameters from the new 3D ramp design data structure employing a computer; and
    employing the plurality of new reference points and plurality of calculated ramp parameters from the new 3D ramp design data structure to display in real time a corresponding new ramp design on a computer-controlled display along with visual indications of compliance or noncompliance of the plurality of calculated new ramp parameters from the new 3D ramp design data structure with the corresponding reference parameters from the reference standard data structure.

2. The computer-implemented method for creating a ramp design as set out in claim 1, wherein the ramp environment data structure comprises reference information for a curb and portion of a sidewalk.

3. The computer-implemented method for creating a ramp design as set out in claim 1, wherein the reference parameters from the reference standard data structure comprise reference slopes for specific sections of a wheelchair accessible ramp and wherein the plurality of calculated new ramp parameters of the new 3D ramp design data structure comprise calculated slopes of a new ramp shape for a wheelchair accessible ramp, and wherein said comparing comprises comparing the calculated and reference slopes for corresponding wheelchair accessible ramp sections.

4. The computer-implemented method for creating a ramp design as set out in claim 3, wherein the calculated slopes of the new ramp shape for a wheelchair accessible ramp include cross slopes of a landing zone section, a ramp slope section and one or more flare sections.

5. The computer-implemented method for creating a ramp design as set out in claim 3, further comprising displaying a plurality of editing tools including a plurality of user movable grip points, wherein the new ramp shape from the new 3D ramp design data structure is automatically adjusted in real time under computer control in response to a user dragging of grip points and the reference information from the ramp environment data structure.

6. The computer-implemented method for creating a ramp design as set out in claim 3, further comprising displaying a table of data values for the ramp design, the table of data values including said calculated slopes.

7. The computer-implemented method for creating a ramp design as set out in claim 6, wherein the table of data values further include ramp elevation values editable by a user, wherein the one or more of the plurality of new reference points from the new 3D ramp design data structure and the calculated slopes are automatically updated as elevations are changed.

8. The computer-implemented method for creating a ramp design as set out in claim 1, wherein the ramp data structure further comprises at least a second plurality of reference points generally corresponding to a second ramp shape.

9. The computer-implemented method for creating a ramp design as set out in claim 8, further comprising displaying a ramp type selection menu, wherein a desired ramp type for use in subsequent steps is selected responsive to a user selection.

10. The computer-implemented method for creating a ramp design as set out in claim 1, wherein the ramp environment data structure comprises survey information for an existing ramp installation environment.

11. The computer-implemented method for creating a ramp design as set out in claim 10, wherein the survey information comprises an elevation map of an existing ramp environment and wherein said elevation map is employed as said vertical reference information.

12. The computer-implemented method for creating a ramp design as set out in claim 1, wherein the ramp environment data structure comprises 3D information for a ramp installation environment.

13. The computer-implemented method for creating a ramp design as set out in claim 1, wherein the ramp environment data structure comprises a 3D model having an upper reference surface which comprises said vertical reference information.

14. The computer-implemented method for creating a ramp design as set out in claim 13, wherein the ramp environment data structure further comprises at least first and second alignment lines corresponding to boundaries of the ramp environment.

15. The computer-implemented method for creating a ramp design as set out in claim 14, wherein the new ramp shape is edited in real time by a user using the graphical user interface to drag reference points, wherein the reference points are conformed to alignment lines during said edits, and wherein ramp reference point vertical information is automatically updated during said edits using the vertical reference information.

16. The computer-implemented method for creating a ramp design as set out in claim 1, wherein said plurality of reference points corresponding to a ramp shape each comprise at least x and y coordinate values and wherein automatically combining data in real time from the ramp data structure with reference information from the ramp environment data structure comprises populating the new reference point coordinates with x and y coordinate values using the reference points from the ramp data structure and z coordinate values using the vertical reference information to create the new 3D ramp data.

17. The computer-implemented method for creating a ramp design as set out in claim 1, wherein said ramp data structure further comprises a point-to-point distance array.

18. The computer-implemented method for creating a ramp design as set out in claim 2, wherein the ramp data structure comprises data corresponding to a dual ramp design type and wherein ramp data is automatically duplicated at first and second curb locations during said combining step.

* * * * *